(12) United States Patent
Chau et al.

(10) Patent No.: US 10,609,544 B2
(45) Date of Patent: Mar. 31, 2020

(54) METHOD AND APPARATUS FOR IDENTIFYING A TARGET DEVICE

(71) Applicant: Futurewei Technologies, Inc., Plano, TX (US)

(72) Inventors: Van So Chau, Carlsbad, CA (US); Jiri Medlen, Fullerton, CA (US); Ping Shi, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 266 days.

(21) Appl. No.: 15/856,374

(22) Filed: Dec. 28, 2017

(65) Prior Publication Data

US 2019/0208395 A1    Jul. 4, 2019

(51) Int. Cl.
| | | |
|---|---|---|
| H04W 8/00 | (2009.01) |
| H04B 7/0452 | (2017.01) |
| H04B 7/06 | (2006.01) |
| H04W 48/14 | (2009.01) |
| H04W 64/00 | (2009.01) |

(Continued)

(52) U.S. Cl.
CPC .......... *H04W 8/005* (2013.01); *H04B 7/0452* (2013.01); *H04B 7/0617* (2013.01); *H04W 48/14* (2013.01); *H04W 64/00* (2013.01); *H04B 17/27* (2015.01); *H04B 17/318* (2015.01)

(58) Field of Classification Search
CPC combination set(s) only.
See application file for complete search history.

(56) References Cited

U.S. PATENT DOCUMENTS

| | | | | |
|---|---|---|---|---|
| 2008/0076430 A1* | 3/2008 | Olson | ................... | H04W 36/32 455/440 |
| 2009/0011713 A1* | 1/2009 | Abusubaih | .............. | G01S 11/02 455/67.11 |

(Continued)

FOREIGN PATENT DOCUMENTS

| CN | 103973343 A | 8/2014 |
|---|---|---|
| CN | 104735810 A | 6/2015 |

OTHER PUBLICATIONS

Hang Yu, "Beamforming on Mobile Devices: A First Study," MS Thesis submitted to Rice University, Apr. 2011, 53 pages.

(Continued)

*Primary Examiner* — Hassan Kizou
*Assistant Examiner* — Abdullahi Ahmed
(74) *Attorney, Agent, or Firm* — Fish & Richardson P.C.

(57) ABSTRACT

A terminal device is configured to perform a method for identifying a target device in a local area network (LAN) comprising a plurality of potential target devices. The method includes communicating in an omni-directional format to obtain discovered devices within the area, communicating in a narrow beam format in a direction of the target device; identifying a first list of a first plurality of devices including the target device; eliminating a device from the first list of devices to create a second list of devices; calculating a distance between the terminal device and each device in the second list of devices; determining a precise distance between the terminal device and the target device using a precise distance measurement method; determine which device of the second list of devices has a distance that compares favorably to the precisely determined distance; and identifying the device ID.

20 Claims, 8 Drawing Sheets

(51) Int. Cl.
*H04B 17/27* (2015.01)
*H04B 17/318* (2015.01)

(56) References Cited

U.S. PATENT DOCUMENTS

| | | | | |
|---|---|---|---|---|
| 2009/0103503 A1* | 4/2009 | Chhabra | ............... | H04W 48/20 |
| | | | | 370/338 |
| 2011/0183685 A1* | 7/2011 | Burton | ................. | G06F 21/316 |
| | | | | 455/456.1 |
| 2013/0010617 A1* | 1/2013 | Chen | .................... | H04W 64/00 |
| | | | | 370/252 |
| 2013/0053061 A1 | 2/2013 | Kang | | |
| 2013/0065615 A1 | 3/2013 | Jeong et al. | | |
| 2013/0294265 A1 | 11/2013 | Peng et al. | | |
| 2016/0014545 A1* | 1/2016 | Tian | ..................... | H04W 76/10 |
| | | | | 455/41.2 |

OTHER PUBLICATIONS

"An Apple-Euro Patent Covers a Next-Gen Millimeter-Wave Yagi Antenna for iPhone, Smart Glasses, TV & More," http://www.patentlyapple.com/patently-apple/2017/08/an-apple-euro-patent-covers-a-next-gen-millimeter-wave-yagi-antenna-for-iphone-smart-glasses-tv-more.html, Aug. 27, 2017, 4 pages.

Manikanta Kotaru et al., "SpotFi: Decimeter Level Localization Using WiFi," SIGCOMM '15, London, UK, Aug. 17-21, 2015, pp. 269-282.

Tom Simonite, "Wi-Fi Trick Gives Devices Super-Accurate Indoor Location Fixes," https://www.technologyreview.com/s/542561/wi-fi-trick-gives-devices-super-accurate-indoor-location-fixes/, Oct. 16, 2015, 2 pages.

Amit Bhawani, "How to Measure the Distance between Objects with Phone Camera on Android," http://androidadvices.com/measure-distance-objects-phone-camera-android/, Apr. 11, 2012, 4 pages.

\* cited by examiner

METHOD AND APPARATUS FOR IDENTIFYING A TARGET DEVICE

TECHNICAL FIELD

The present invention relates to wireless communications. More particularly, the present invention relates to a method and an apparatus for identifying and communicating with a target device by a terminal device.

BACKGROUND

In recent wireless communications, especially in social environment, it is very popular that friends or colleagues split expenses or share photos or videos or other content with each other at a social event via a terminal device. By using Bluetooth or wireless fidelity (Wi-Fi) protocol communications, a terminal device can discover other terminal devices via scanning. IEEE 802.11 standard technologies, for example, allow a terminal device to discover an access point (AP) and/or other Wi-Fi device(s). Such discovery allows the terminal device to be connected to the AP or with the other terminal devices through the AP or directly using Peer-to-Peer communications.

Many terminal devices use generic naming nomenclature such as a hardware model number. The generic name of the terminal device is presented when the terminal device is scanned by another terminal device. When there are multiple terminal devices in an area, especially when there are multiple terminal devices that are similar, the terminal device that is scanning the area cannot identify which target device is which based on the scanned generic names that are produced. Accordingly, when a user reviews the scan results, it is difficult to pick the one that the user wants to communicate with to, for example, either share data (such as contact information), pictures or files.

SUMMARY

A first aspect of an example embodiment includes a method performed by a terminal device for identifying a target device in a local area network (LAN) comprising a plurality of potential target devices. In the method, the terminal device communicates in an omni-directional format to obtain discovered devices within the area, wherein the discovered devices include a target device; and then communicates in a narrow beam format in a direction of the target device. And then the terminal device identifies a first list of a first plurality of devices including the target device, wherein the first list comprises a device identifier (ID) of each device of the first plurality of devices; eliminates a device from the first list of devices to create a second list of devices, wherein the eliminated device has a lower relative received signal strength (RSSI). And then the terminal device calculates a distance between the terminal device and each device in the second list of devices and determine a precise distance between the terminal device and the target device using a precise distance measurement method. Based on the two kind of distance, the terminal device compares the measured precise distance to the calculated distance for each device in the second list of devices to determine which device of the second list of devices has a distance that compares favorably to the precisely determined distance and identify a first list of a first plurality of devices including the target device, wherein the first list comprises a device identifier (ID) of each device of the first plurality of devices. Through the solution provided, via comparing the calculated distances between the terminal device 104G and each of the devices selected in each pointed direction, and the precisely measured distance between the terminal device and each target device, identifying the target device ID may be quick and correct in public area comprising a plurality of potential target devices.

A second aspect of an example embodiment includes a terminal device for identifying a target device in a local area network (LAN) comprising a plurality of potential target devices. The terminal device comprises a non-transitory memory comprising instructions and one or more processors in communications with the memory, wherein the one or more processors are configured to execute the instructions to performing the steps performed by the terminal device in the first aspect of an example embodiment.

A third aspect of an example embodiment includes a computer readable media that includes computer instructions that, when executed by a processor, cause a processor host device to perform the steps performed by the terminal device in the first aspect of an example embodiment.

A fourth aspect of an example embodiment includes a terminal device. Wherein the terminal device includes the function of the terminal device in the first aspect of an example embodiment. The functions may be realized by hardware, or may be realized by software which are performed by hardware. And the hardware or the software include one or more module corresponding to the functions.

A fifth aspect of an example embodiment includes a computer storage media. Where the computer storage media stores instructions performed by the terminal device in the first aspect of an example embodiment, and stores the program performed in the first or the fourth aspect of an example embodiment.

BRIEF DESCRIPTION OF THE DRAWINGS

Further features and advantages of the present invention will become apparent from the following detailed description, taken in combination with the appended drawings, in which.

DETAILED DESCRIPTION

Figure 1:
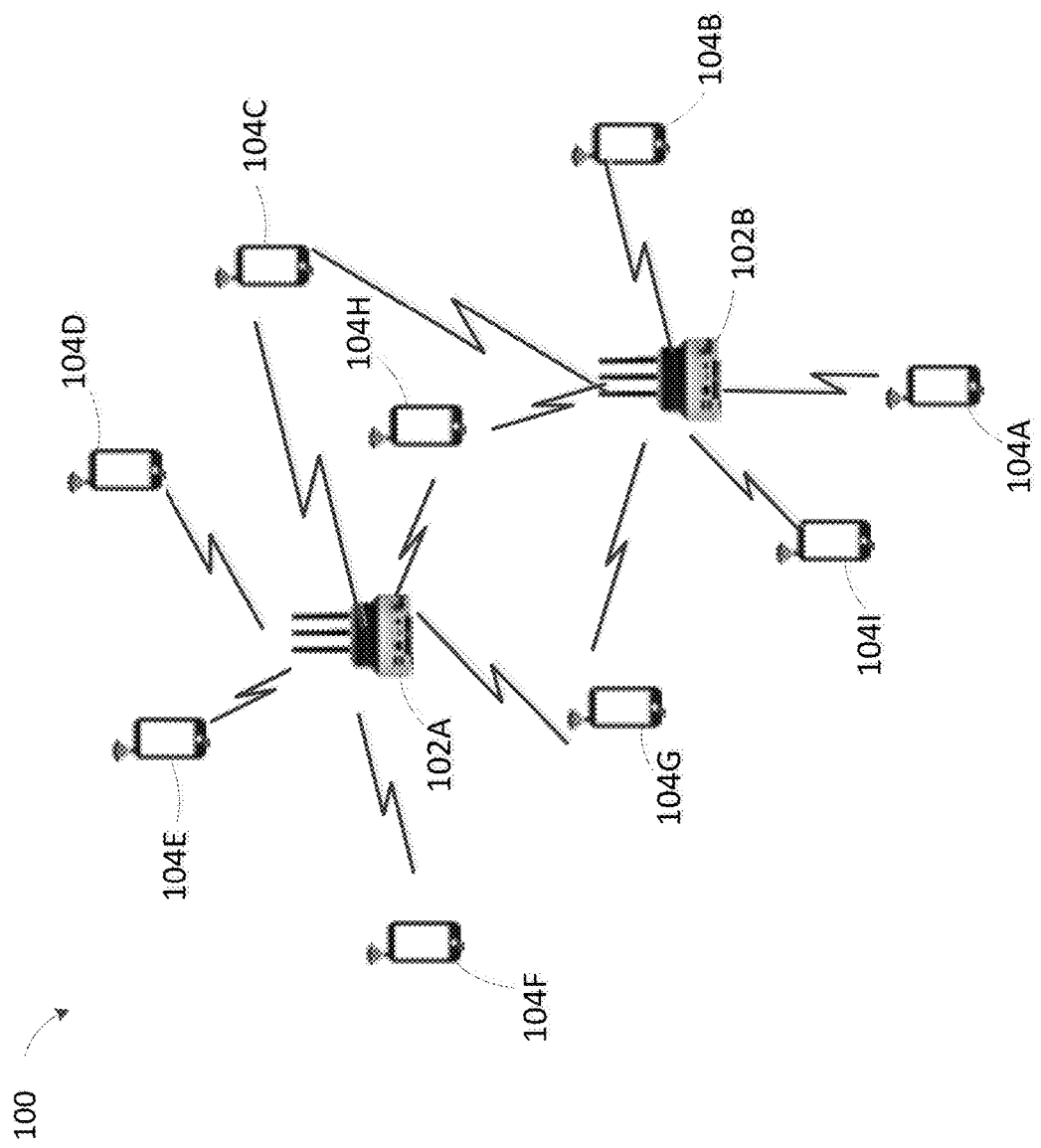
FIG. 1 illustrates a communication system 100 that may be used for implementing terminal devices and methods in accordance with representative embodiments of the present disclosure.

In the following description, reference is made to the accompanying Figures that form a part of the present disclosure, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be defined by software executed by a processor in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Wi-Fi (WiFi) protocol standards communications, such as IEEE 802.11 and 802.15 define wireless local area networking (WLAN) access point (AP) communications with terminal devices. The terminal devices using Wi-Fi protocol communications include personal computers, video-game consoles, cell phones and tablets, digital cameras, smart TVs, digital audio players and modern printers. Wi-Fi compatible devices can connect to the Internet via a WLAN and an access point (AP). The AP is a device that creates a wireless local area network (WLAN) usually in a home, an office or a large building. The AP connects to a wired router, a switch, or a hub via an Ethernet cable, and projects a Wi-Fi signal throughout a designated area. An AP according to IEEE protocols (or hotspot) has a range of about 20 meters (66 feet) indoors and a greater range outdoors. The AP contiguous coverage area can be as small as a single room, or as large as many square kilometers if multiple overlapping access points or boosting circuits are utilized.

Wi-Fi technology communications devices also support ad hoc communications directly from one terminal device to another terminal device without communicating through the AP as an intermediary. This wireless ad hoc network mode has proven popular with multiplayer handheld game consoles, such as the Nintendo DS, a PlayStation Portable, digital cameras, and other consumer electronics devices. Some terminal devices can also share their Internet connection using ad hoc, becoming hotspots or "virtual routers". Another mode of direct communication over Wi-Fi is Tunneled Direct Link Setup (TDLS), which enables two terminal devices on the same Wi-Fi network to communicate directly, instead of via the AP.

FIG. 1 illustrates a communication system 100 that may be used for implementing terminal devices and methods in accordance with representative embodiments of the present disclosure. According to FIG. 1, at least two access points (APs)102A-102B are located in the local area, may provide location information and device identifier (ID) of each of terminal devices in the communication system. Multiple terminal devices (such as terminal devices 104A-104I) are also located in the local area and may connect to a local area network via the APs 102A-102B.

The APs 102A-102B in FIG. 1 connect the multiple terminal devices 104A-104I to an adjacent wired local area network (LAN). The APs 102A-102B resemble a network hub, relaying data between connected wireless devices in addition to a (usually) single connected wired device, most often an Ethernet hub or switch, allowing the terminal devices to communicate with other terminal devices.

The terminal devices 104A-104I all support a Wi-Fi connecting function, and may receive signals from the AP 102A and/or AP 102B, receive location information and device identifier (ID) of each of terminal devices in the LAN, discover (by scanning or other solution) other terminal devices supporting the Wi-Fi connecting function in the same LAN, identify a target device from the discovered devices based on the location information and device ID from the APs, and establish direct communication with the target device based on the identified device ID in the same LAN via the Wi-Fi connecting function.

The terminal devices 104A-104I may represent any suitable end user device and may include such a device (or may be referred to) such as, a user equipment (UE), a wireless transmit/receive unit (WTRU), a mobile station, a fixed or mobile subscriber unit, a pager, a cellular telephone, a personal digital assistant (PDA), a smartphone, a laptop, a computer, a touchpad, a wireless sensor, or a consumer electronics device.

Figure 2:
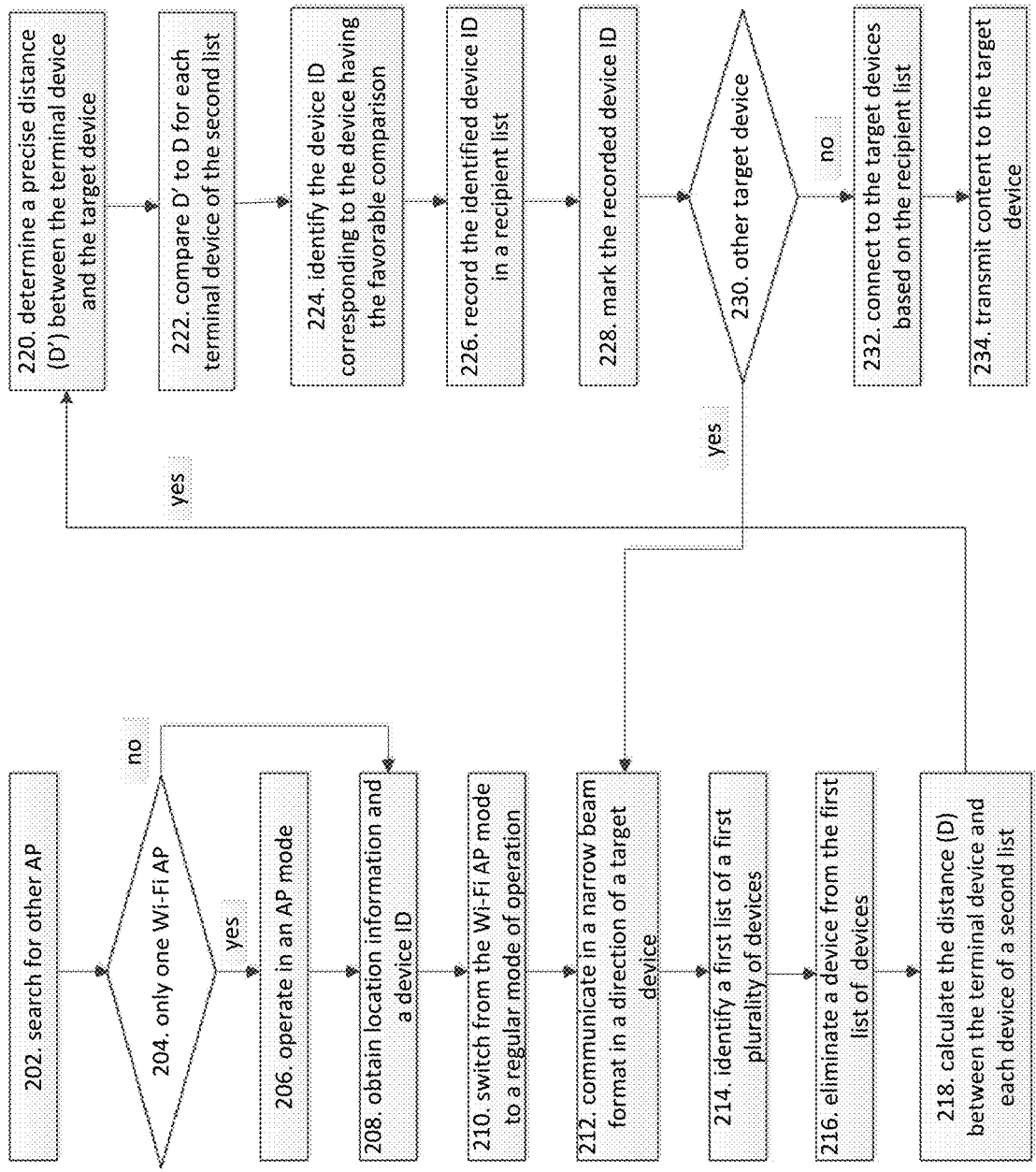
FIG. 2 illustrates a flow diagram of an embodiment of a method for identifying target device(s) within a Wi-Fi network and establishing connection with the identified target device(s) after all target devices have been identified.

FIG. 2 illustrates a flow diagram of an embodiment of a method for identifying target device(s) within a Wi-Fi network and establishing connection with the identified target device(s) after all target devices have been identified. It should be understood that the method according to the present disclosure may be carried out in the communication system as illustrated in FIG. 1. The flow diagram is performed in the terminal device 104G which needs to identify at least one target device and connect to at least one target device. As an example in the flow diagram of FIG. 2, the terminal device 104G in the communication system 100 establishes a connection to the target device 104H and the target device 104I, and performs the steps illustrated with respect to the flow diagram in FIG. 2.

In Step 202, terminal device 104G searches for other AP within the area (e.g., an area that can be serviced by the terminal device 104G acting as an AP) using a wireless local area network (WLAN) protocol such as IEEE 802.11.

In Step 204, the terminal device 104G determines whether there is only one Wi-Fi AP in the local area. If there is only one Wi-Fi AP, the terminal device 104G performs Step 206, otherwise, the terminal device 104G performs Step 208.

In the described embodiment, the APs 102A-102B in the local area may be used to provide a location estimate of each terminal device in the local area as is described below in relation to FIG. 3. Accuracy of a location estimates generally improve with more APs.

In Step 206, the terminal device 104G operates in an AP mode so that the location estimates may be determined using triangulation techniques.

Generally, in one embodiment, at least two APs are necessary for accurate estimation. Increasing the number of APs in the local area, however, increases the accuracy of the location estimates. Alternatively, a technology for improving the location estimates with just one AP is under development and when such technology is available, such technology may be used in place of using multiple APs to perform the location estimation for the user devices within the area. When such technology is used, steps 202-206 do not need to be performed. One name for such technology that is currently under development at Stanford University is SpotFi.

In Step 208, the terminal device 104G obtains location information and a device ID of each of discovered devices.

Terminal device 104G may discover and communicate to other terminal devices in the LAN via scanning or other solutions. The discovered terminal devices are also called discovered devices. In the described embodiment, the terminal device 104G communicates in an omni-directional format to obtain information of the discovered devices. Each of the discovered devices supports the WLAN communications, and can connect to the terminal device 104G or the APs 102A-B via Wi-Fi connection based on a connection request from the terminal device 104G. Referring back to FIG. 1, the discovered devices may be the terminal devices 104A-104F, and the terminal devices 104H-104I. The omni-directional format allows the terminal device 104G to receive radiated radio wave powers uniformly in all directions in one plane.

After discovering the other terminal devices, the terminal device 104G typically receives generic names of the discovered devices. Because the terminal device 104 does not receive the device ID of each of terminal devices, however, it cannot determine which device is the one that it wants to communicate with. Accordingly, the remaining steps are directed to allowing the terminal device 104G to obtain location information and a device ID of each of terminal devices. In the examples discussed below, the terminal device 104G may use any one of at least two solutions to obtain the location information and the device ID of each of the discovered devices.

For example, the terminal device 104G includes a SpotFi algorithm and may estimate the location information of the discovered devices connected to the AP 102A or 102B via the SpotFi algorithm. The SpotFi algorithm may be referred to in FIG. 3.

For another example, the SpotFi algorithm is set in the APs of the local area, such as the APs 102A-102B. It is the APs 102A-102B that estimate the location information of the terminal devices connected to the APs. Accordingly, the terminal device 104G obtains the location information and the device ID of each of the discovered devices from the APs 102A-102B.

In Step 208, The terminal device 104G obtains location information and the device ID of each of the discovered devices 104A-104F and 104H-104I, and records the obtained location information and the device ID. The details of estimating the location of each of the set devices via the SpotFi algorithm may be referred to FIG. 3.

If the terminal device 104G performs Step 206, the terminal device 104G performs Step 210 after performing Step 208. If the terminal device 104G does not perform Step 206, the terminal device 104G performs Step 212 directly after performing Step 208.

In Step 210, the terminal device 104G switches from the Wi-Fi AP mode to a regular mode of operation.

After obtaining the location information and device ID of each of the discovered device, the terminal device 104G switches the Wi-Fi AP mode to a regular mode. The switching may be implemented via any known solution, just as via user's command, and so on.

In Step 212, the terminal device 104G communicates in a narrow beam format in a direction of a target device (any terminal device in the local area and discovered by the terminal device 104G).

The terminal device 104G comprises, in one embodiment, a first button to switch between the omni-directional format and the narrow beam format. The switch may be a physical switch or a soft switch. In one particular embodiment, the user terminal transmits through a dedicated directional antenna or transmits narrow a beam of an omni-directional antenna via beamforming technique, as long as the physical switch remains depressed. Once the user is no longer depressing the switch, the terminal device reverts to using the omni-directional antenna for omni-directional communications.

When the user activates the terminal device 104G to transmit narrow a beam (regardless of whether it is using a dedicated narrow beam antenna or uses the omni-directional antenna with beam forming techniques), the terminal device 104G is expected to be oriented towards the target device to communicate in the direction of the target device based on the user's instruction as a part of identifying the target device terminal ID to support direct communications.

The dedicated directional antenna is, in one embodiment, a high-gain antenna (HGA). The narrow-beamed directional antenna focuses wireless signals in a specific direction resulting in a limited coverage area. The narrow beam width allows more precise targeting of radio signals from other terminal device. The narrow-beamed directional antenna radiates a signal that will have a higher signal strength for receivers that are located in the direction which the terminal device 104G is being pointed. The narrow-beamed directional antenna allows for increased performance and reduced interference from unwanted sources. Similarly, signals that are transmitted by other devices that are located in the direction which the terminal device 104G is being pointed will be received with a substantially higher signal strength than other terminals within the same area that are not in said direction.

In Step 214, the terminal device 104G identifies a first list of a first plurality of devices from the discovered devices from the communications in Step 212.

After the narrow beam communications in the direction of the target device, the terminal device 104G may identify a first list of a first plurality of devices including the target device from the discovered devices. Wherein the first list comprises a device identifier (ID) of each device of the first plurality of devices. The first plurality devices are in the direction of the target device and/or near the direction of the target device. Different direction may have different relative received signal strength (RSSI) depending upon their positions in relation to the direction that terminal device 104G is being pointed.

In Step 216, the terminal device 104G eliminates, based on the RSSI of the first plurality of devices, at least one of device from the first list of the devices having a substantially lower RSSI to create a second list of devices.

Typically, the second list of devices is a subset of the first list of devices and can be expected to often have a lower number of devices within the list.

For example, the terminal device 104G communicates in the direction of the terminal device 104H, the narrow-beamed directional antenna of the terminal device 104G may receive signals from other terminal devices in the limited coverage area, such as terminal device 104H, 104C, 104D, 104I. Therefore, the first list of the first plurality of terminal devices comprises terminal device 104H, 104C, 104D, 104I. In this example, the second list is half the size of the first list based on the RSSI readings that are affected by the direction and use of the narrow transmission beam.

In one embodiment, the number of devices in the second list may be a selectable number that is selected either via firmware or user option. For example, if the second list is limited to three devices, then, according to one embodiment, the devices having the top three RSSI will be selected and included in the second list.

In Step 218, the terminal device 104G calculates the distance (D) between the terminal device 104G and each device in the second list of devices based upon the location estimates (acquired by any means) and the location of terminal device 104G. It should be noted that the first list of devices, and therefore the second list of devices, includes the advertised device names (the generic names) as well as the device IDs. Accordingly, terminal device 104G correlates the device IDs to the calculated distances. For example, assuming that there are 2 terminal devices in the second list of devices, such as the terminal device 104H and the terminal device 104C. The distance between the terminal device 104G and each of the second devices may be D1 for terminal device 104H and D2 for terminal device 104C.

In Step 220, the terminal device 104G determines a precise distance (D') between the terminal device 104G and the target device using a precise distance calculation method. The precise distance calculation method is not based on the location information of the target device. Instead, it is based upon a device configured to measure distances such as a laser based range finder or a radar based range finder. It should be noted that Step 220 may be performed before Step 218.

In Step 222, the terminal device 104G compares the precise distance (D') to the calculated distance (D) for each device in the second list of devices to determine which device has a distance that compares favorably to the precisely determined distance. More specifically, the terminal device 104G compares D1 with D', and D2 with D' to determine which device of the second list of devices had a distance that compares favorably to the precisely determined distance. For example, device of the second list of devices has a distance that compares favorably to the precisely determined distance may be the device whose distance is most similar to the precise distance D'. By comparing favorably, the comparison need not be exactly the same but only proximately the same since the calculated distances are based upon position estimates that may not be exactly correct. If, for example, D1 calculates to be 25 feet away and D2 calculates to be 15 feet away while D' is known to be exactly 16.5 feet away, D2 is determined to be the target device because its calculated distance is so much closer to the actual distance D' in comparison to D1.

If there are at least two terminals in the second list having same distance to the terminal device 104G and compares favorably to the precisely determined distance, the terminal device 104G may instruct an error to the user, to trigger the user to change the location of the terminal device 104G, to perform Steps 212-220 again.

In Step 224, the terminal device 104G identifies the device ID corresponding to the device having the favorable comparison (terminal device 104H) as the device ID of the target device.

In Step 226, the terminal device 104G records the identified device ID in a recipient list.

In Step 228, the terminal device 104G marks the recorded device ID as the identified device recorded in Step 208, to avoid the need to repeat the process in the future to establish direct communications with the identified device.

In Step 230, the terminal device 104G determines whether there is other target device to be identified. If yes, the process returns to Step 212, otherwise, performs Step 232.

The terminal device 104G comprises a second button, i.e, "Done", to instruct whether there is another target device to be identified. If the terminal device 104 G checks that the second button is pressed, it means there is no more target device to identify. It then performs Step 232.

If the terminal device 104G checks that the second button is not pressed, the terminal device 104G should perform Steps 212 to 230 again until all target devices have been identified.

The second button may be a soft button. The terminal device 104G determines whether the soft button is pressed to determine whether there is other target device to be identified.

In Step 232, the terminal device 104G connects to the target devices based on device IDs in the recipient list.

Specifically, the terminal device 104G sends a connection request to each of the target devices based on device IDs in the recipient list.

In Step 234, the terminal device 104G may transmit content to the target devices connected to the terminal device 104G after connections between the terminal device 104G and the targets device are established. The content may be files, video, photo, document and so on.

Because the generic names of devices such as Iphone 7, P9, and so forth, they cannot be identified by human or the terminal device 104G on the Wi-Fi discovered or scanned list of devices as the target device(s). Therefore, comparing the calculated distances between the terminal device 104G and each of the devices selected in each pointed direction, and the precisely measured distance between the terminal device 104G and each target device is necessary.

Figure 3:
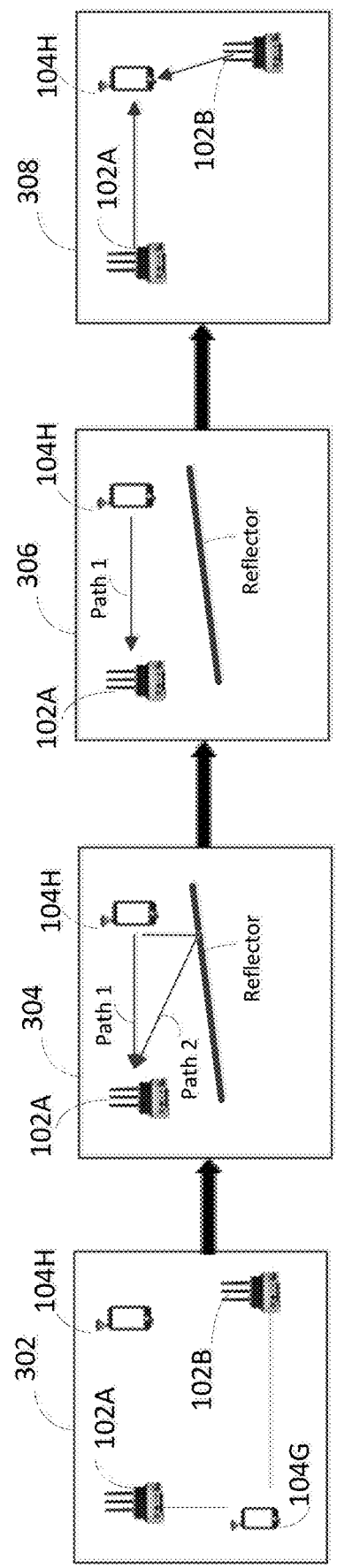
FIG. 3 illustrates a network that illustrate an embodiment of a method for estimating a location of a target device.

FIG. 3 illustrates a network that illustrates an embodiment of a method for estimating a location of a target device, which enables calculating the distance between the terminal device and the target device. It is expressly understood that the embodiment method may be carried out in the context of the system and methods as illustrated in FIGS. 1 & 2.

In FIG. 3, there are 2 APs including AP 102A and AP 102B, and a terminal device 104G wherein at least one device includes technology such as the SpotFi algorithm previously described, and a target device 104H as an example. In this example, it is assumed that the terminal device 104G includes the SpotFi algorithm.

In Block 302, Both the APs including AP 102A and 102B send Channel State Information (CSI) and RSSI measurements to the terminal device 104G. All the APs are presumed to be able to receive a packet transmitted by a target device 104H. The APs may obtain a CSI and a RSSI measurements based on the packet from the terminal device 104H, and send the obtained CSI and RSSI measurements to the server In Block 304, the SpotFi algorithm of the terminal device 104G calculates a time of flight (ToF) and an angle of arrival (AoA) of all propagation paths from the terminal device 104H to each of the APs based on the CSI from each of the APs. The ToF is the time that an object needs to travel a distance through a medium. The AoA is a method for determining the direction of propagation of a radio-frequency wave incident on an antenna array.

In Block 306, the SpotFi algorithm of the terminal device 104G then identifies a direct path between the terminal device 104H and each of the APs that did not undergo any reflections. Such as the direct path between the terminal device 104H and the AP1 in FIG. 3.

In Block 308, the SpotFi algorithm of the terminal device 104G estimates the location of the target device (the terminal device 104H) by using the direct path AoA estimation and the RSSI measurements from all the APs.

In this example, The Step 218 in FIG. 2 is the terminal device 104G obtains the distance between the terminal device 104G and the each of devices in the second list based on the location information estimated by the SpotFi algorithm of the terminal device 104G.

If the server is the AP including the SpotFi algorithm, the Step 218 in FIG. 2 is the terminal device 104G obtaining the distance between the terminal device 104G and each of the second set of terminal devices based on the location information.

Figure 4:
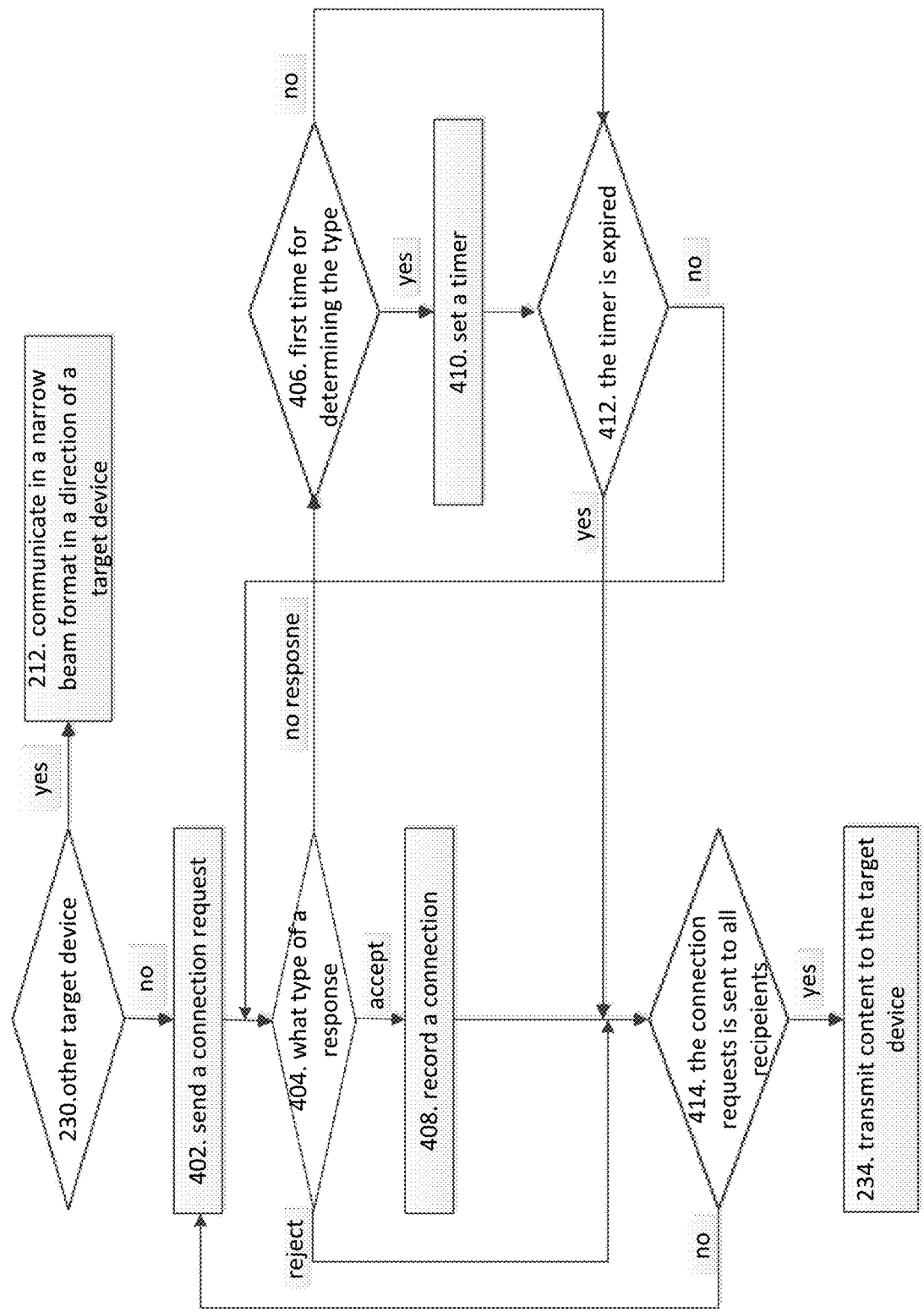
FIG. 4 illustrates a flow diagram of an embodiment of a method for connecting the target device(s) after the terminal device identifies the target device(s).

FIG. 4 illustrates a flow diagram of an embodiment of a method for connecting the target device after the terminal device identifies the target device. The process of FIG. 4 may be the details for Steps 230 and 232 in FIG. 2. It is expressly understood that the embodiment method may be carried out in the context of the communication system as illustrated in FIG. 1. The flow diagram is performed in the terminal device 104G which identifies at least one target device and connects to at least one target device. As an example in the flow diagram, the terminal device 104G in the communication system 100 establishes a connection to the terminal device 104H and the terminal device 104I, and performs the flow diagram in FIGS. 2 and 4.

The flow diagram of FIG. 4 starts with Step 230 of FIG. 2, after the terminal device 104G determines that there is no other target device to be identified. Thereafter, the terminal device 104G performs Step 402.

In Step 402, the terminal device 104G sends a connection request to each of target devices whose device IDs are included in the recipient list.

The connection request may be a Wi-Fi connection request. As an example, it is assumed that the recipient list comprises the device IDs of the terminal device 104H and the terminal device 104I. Therefore, the target devices are the terminal device 104H and the terminal device 104I.

In Step 404, the terminal device 104G determines what type of a response is received from the target devices. If the response from the target device represents that the target device accepts the connection, the terminal device 104G performs Step 408. If the response from the target device represents that the target device rejects the connection, the terminal device 104G performs Step 414. If there is no response from the target device, the process performs Step 406.

In Step 406, the terminal device 104G determines whether it is the first time for determining the type of a response from the target device. If yes, performs Step 410. If no, performs Step 412.

In Step 408, the terminal device 104G records a connection between the terminal device 104G and the target device which accepts the connection request.

In Step 410, the terminal device 104G sets a timer for the target device which has not responded to the connection request.

In Step 412, the terminal device 104G determines whether the timer is expired. If the timer is expired, which means that the target device rejects the connection request, the terminal device 104G performs Step 414. If the timer is not expired, the terminal device 104G performs Step 404 again.

In Step 414, the terminal device 104G determines whether the connection request is sent to all the recipients in the recipient list. If the connection request is sent to all the target devices whose device IDs are in the recipient list, or if there is an indication that the user has terminated the process by depression of a dedicated switch or soft key on the terminal device 104G, the terminal device 104G performs Step 234. If there is at least one other target device for which the connection request has not been sent, the terminal device 104G performs Step 402 to send the connection request to repeat the process until the connection request has been sent to all terminal devices in the recipient list.

As another solution, the terminal device 104G may also include a third button (such as a done button) to instruct whether target device which does not receive the connection request before. If the terminal device 104 G checks that the second button is pressed, it means the terminal device 104G terminates the process of sending the connection requests to the target devices which have not received the connection request before. It then performs Step 234. If the terminal device 104G determines that the third button has not been depressed or activated (if a "soft" button), the terminal device performs Steps 402-414 again until all target devices in the recipient list have received the connection request.

In Step 234, the terminal device 104G transmits content to the target device which have accepted the connection request(s).

Figure 5:
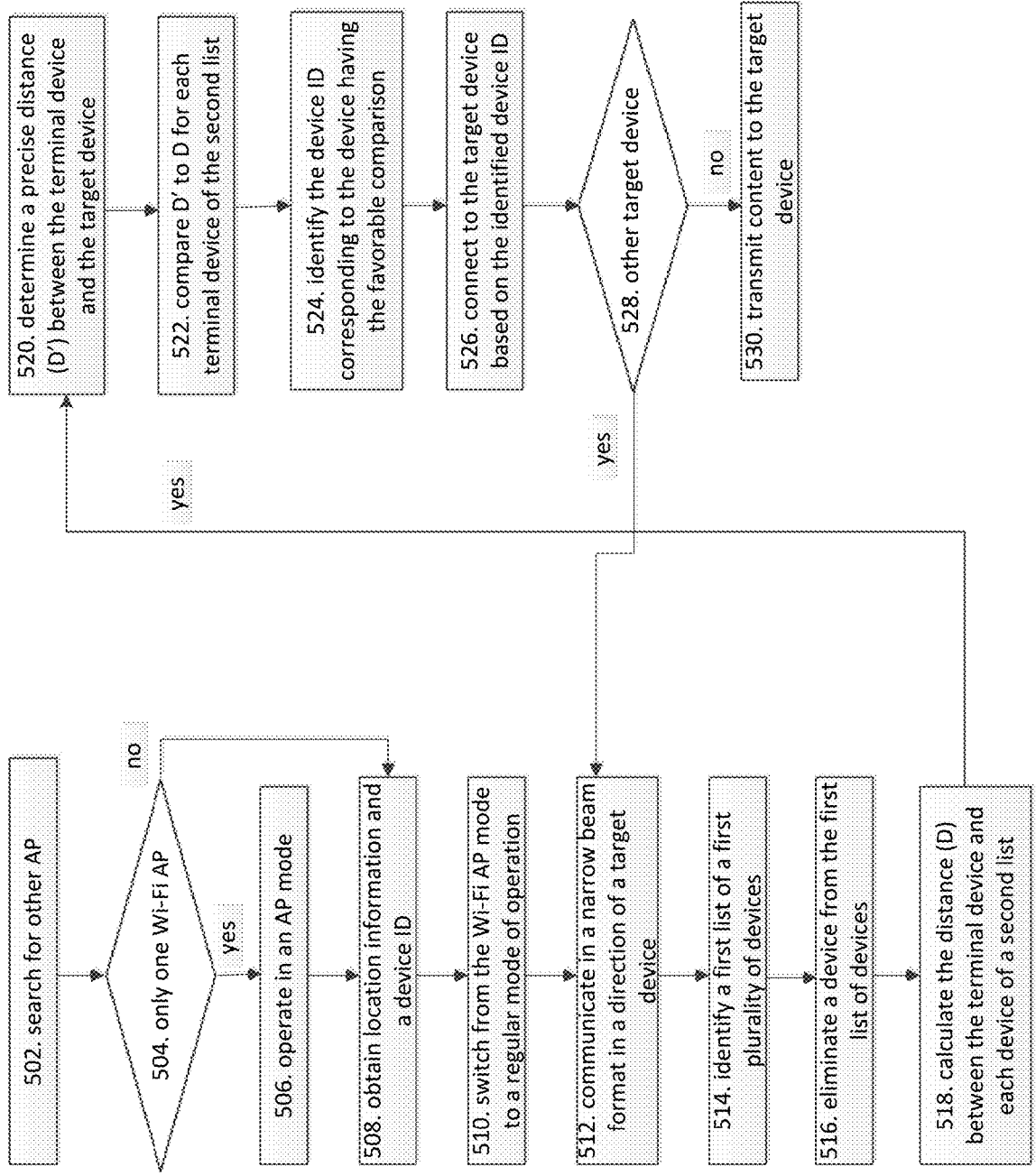
FIG. 5 illustrates a flow diagram of an embodiment of a method for identifying a target device within a Wi-Fi network and establishing connection with the target device once the terminal device identifies the target device.

FIG. 5 illustrates a flow diagram of an embodiment of a method for identifying a target device within a Wi-Fi network and establishing connection with the target device once the terminal device identifies the target device. It is expressly understood that the embodiment method may be carried out in the context of the communication system 100 as illustrated in FIG. 1. The flow diagram is performed in a terminal device 104G should identify a target device and connect to the target device. As an example in the flow, the terminal device 104G in the communication system 100 will establish a connection to the terminal device 104H and the terminal device 104I, and performs the flow diagram in FIG. 5.

The flow in FIG. 5 is similar to the flow in FIG. 2, Steps 502-524 are the same as Steps 202-224 in FIG. 2. In FIG. 5, the terminal device 104G connects to the target device right after the terminal device 104G identifies the device ID of the selected device, and does not record the device ID of the identified device in a receipt list.

In Step 526, the terminal device 104G connects to the target device according to the device ID of the identified device.

In Step 528. The terminal device 104G determines whether there is another target device to be connected. If yes, performs Step 512. If No, no other action for identifying a target device to be done, and the processing of identifying the target device in local area network is terminated, and performs Step 530.

Step 528 may refer to the description of Step 230. The terminal device 104G comprises a second button, i.e, "Done", to instruct whether there is another target device to be connected. If the terminal device 104 G checks that the second button is pressed, it means there is no more target device to identify. The identification process is done.

In Step 530, the terminal device 104G transmits content to the target device via the connection between the terminal device 104G and the target device.

Figure 6:
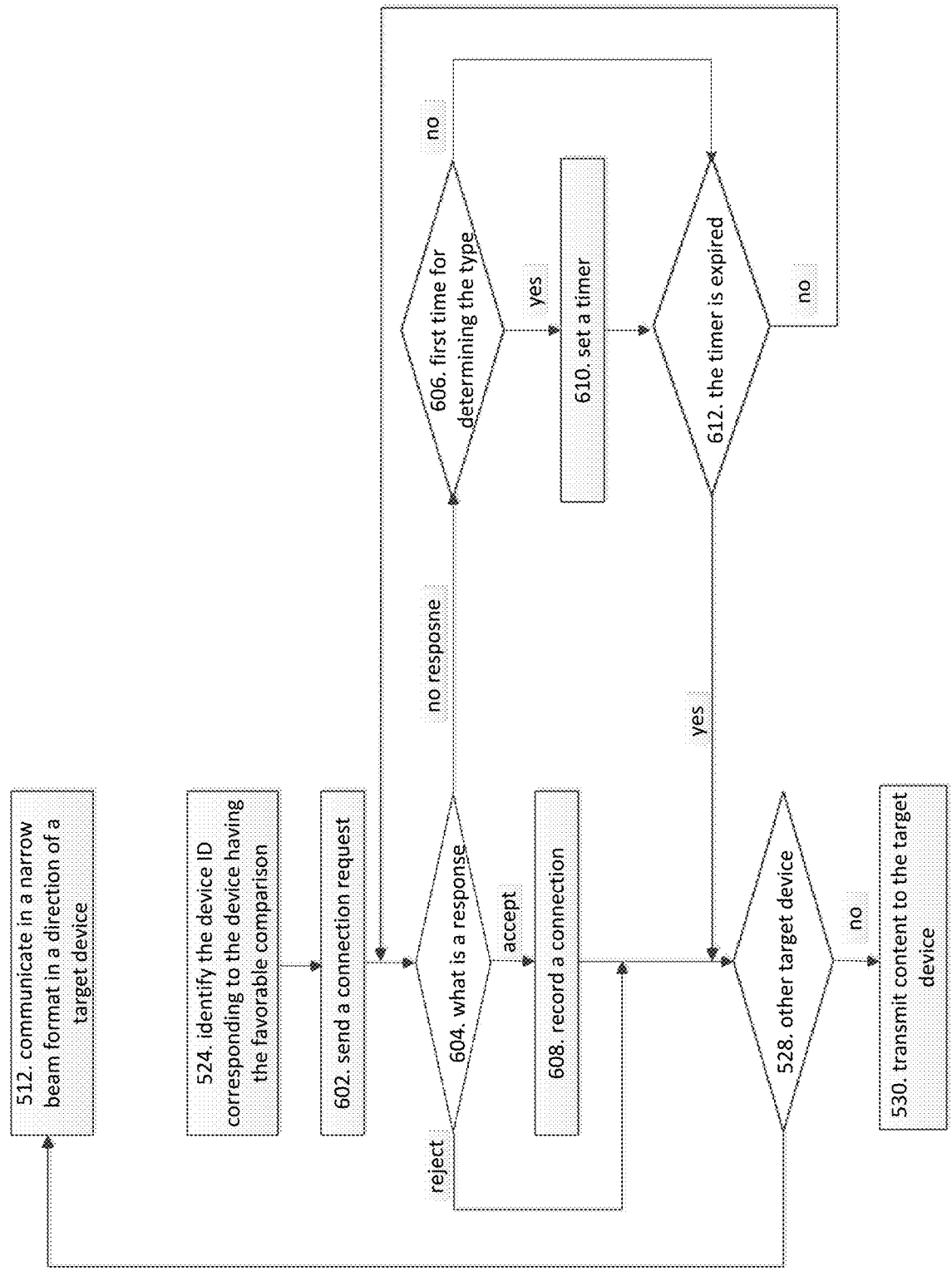
FIG. 6 illustrates a flow diagram of an embodiment of a method for connecting the target device within a Wi-Fi network after the terminal device identifies the target device.

FIG. 6 illustrates a flow diagram of an embodiment of a method for connecting the target device after the terminal device identifies the target device. The process of FIG. 6 may be the details for Step 526 in FIG. 5. It is expressly understood that the embodiment method may be carried out in the context of the communication system 100 as illustrated in FIG. 1. The flow diagram is performed in the terminal device 104G which identifies a target device and connects to the target device. As an example in the flow, the terminal device 104G in the communication system 100 will establish a connection to the terminal device 104H and the terminal device 104 I, and performs the flow diagram in FIGS. 5 and 6.

The flow diagram of FIG. 6 starts with Step 524 of FIG. 5, which corresponds to Step 224 of FIG. 2, after the terminal device 104G identifies the device ID corresponding to the device having the favorable comparison (the terminal device 104H) as the device ID of the target device. Thereafter, the terminal device 104G performs Step 602.

A description for Steps 602 to 612 may be refer to the description of Steps 402 to 412.

In Step 602, the terminal device 104G sends a connection request to the target device based on the device ID of the identified target device (the terminal device 104H).

In Step 604, the terminal device 104G determines what type of a response is received from the target device (the terminal device 104H). If the response from the target device represents that the target device accepts the connection, the terminal device 104G performs Step 608. If the response from the target device represents that the target device rejects the connection, the terminal device 104G performs Step 614, the terminal device 104G end the process of connecting. If there is no response from the target device, the process performs Step 606.

In Step 606, the terminal device 104G determines whether it is the first time for determining the type of a response from the target device. If yes, performs Step 610, if no, performs Step 612.

In Step 608, the terminal device 104G records a connection between the terminal device 104G and the target device.

In Step 610, the terminal device 104G sets a timer for the target device which has not respond to the connection request.

In Step 612, the terminal device 104G determines whether the timer is expired. If it is, which means that the target device rejects to the connection request, the terminal device 104G performs Step 528. If the timer is not expired, the terminal device 104G performs Step 604 again.

In step 528. The terminal device 104G determines whether there is another target device to be connected. If yes, performs Step 512. If No, no other action for identifying a target device to be done, and the processing of identifying the target device in local area network is terminated, and performs Step 530.

In Step 530, the terminal device 104G transmits content to the target device via the connection between the terminal device 104G and the identified device.

Figure 7:
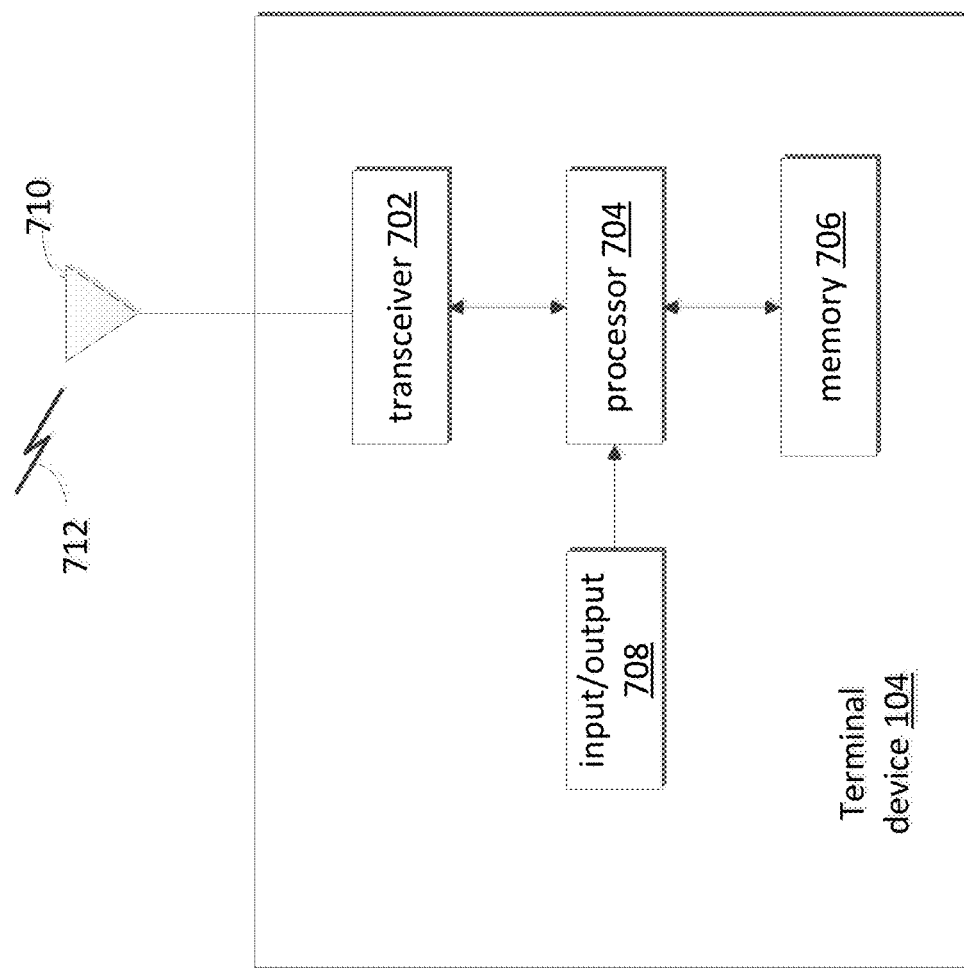
FIG. 7 illustrates a block diagram of a terminal device that may be used for implementing the methods according to an example embodiment.

FIG. 7 illustrates an example of a terminal that may be used for implementing the methods according to an example embodiment. These components could be used in the communication system 100 or in any other suitable system, and performs the Steps of FIGS. 2-6 performed by the terminal device.

As shown in FIG. 7, the terminal device 104 includes at least one processor 704. The processor implements various processing operations of the terminal device 104. For example, the processor 704 could perform signal coding, data processing, power control, input/output processing, scanning and identifying other terminal devices supporting the Wi-Fi connecting function in a LAN, establishing direct communication with other terminal devices in the same LAN via the Wi-Fi connecting function, or any other functionality enabling the terminal device 104 to operate in the communication system 100. The processor 704 also supports the methods and teachings described in more detail above corresponding to FIGS. 1-6. Each processor 704 includes any suitable processing or computing device configured to perform one or more operations. Each processor 704 could, for example, include a microprocessor, microcontroller, digital signal processor, field programmable gate array, or application specific integrated circuit.

The terminal device 104 also includes at least one transceiver 702. The transceiver 702 is configured to modulate data or other content for transmission by at least one antenna or NIC (Network Interface Controller) 710, but typically more than one antenna for beamforming purposes. The transceiver 702 is also configured to demodulate data or other content received by the at least one antenna 710. Each transceiver 702 includes any suitable structure for generating signals for wireless or wired transmission and/or processing signals received wirelessly or by wire. Each antenna 710 includes any suitable structure for transmitting and/or receiving wireless or wired signals. One or multiple transceivers 702 could be used in the terminal device 104, and one or multiple antennas 710 could be used in the terminal device 104. Although shown as a single functional unit, a transceiver 702 could also be implemented using at least one transmitter and at least one separate receiver.

The terminal device 104 may include or have access to an input interface/an output interface 708, coupled to the processor. The output interface 708 may include a display device, such as a touchscreen, that also may serve as an input device. The input interface 708 may include one or more of a touchscreen, touchpad, mouse, keyboard, camera, one or more device-specific buttons, one or more sensors integrated within or coupled via wired or wireless data connections to the terminal device 104, and other input devices. The terminal device 104 may operate in a networked environment using a communication interface to connect to one or more remote computers, such as database servers or other terminal devices or systems. The remote computer may include a personal computer (PC), server, router, network PC, a peer device or other common DFD network switch, or the like. The communication interface may communicate over a Local Area Network (LAN), a Wide Area Network (WAN), cellular network, WiFi, Bluetooth, or other networks or systems.

In addition, the terminal device 104 includes at least one memory 706. The memory 706 stores instructions that defined the previously described algorithms and method steps and further stores data used, generated, or collected by the terminal device 104. For example, the memory 706 could store software or firmware instructions executed by the processor 704 and data used to scan and identify other terminal devices supporting the Wi-Fi connecting function in a LAN, establish direct communication with other terminal devices in the same LAN via the Wi-Fi connecting function. Each memory 706 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

Although the example terminal device is illustrated and described as mobile phone 104, the terminal device may be in different forms in different embodiments. For example, the terminal device may instead be a smartphone, a tablet, smartwatch, or other device including the same or similar elements as illustrated and described with regard to FIG. 7. Devices, such as smartphones, tablets, and smartwatches, are generally collectively referred to as mobile devices or user equipment. Further, although the various data storage elements are illustrated as part of the terminal device 104, the storage may also or alternatively include cloud-based storage accessible via a network, such as the Internet or server based storage.

The terminal device 104 may include or have access to a computing environment that includes a variety of computer-readable media, such as volatile memory and/or non-volatile memory, removable storage and/or non-removable storage.

Figure 8:
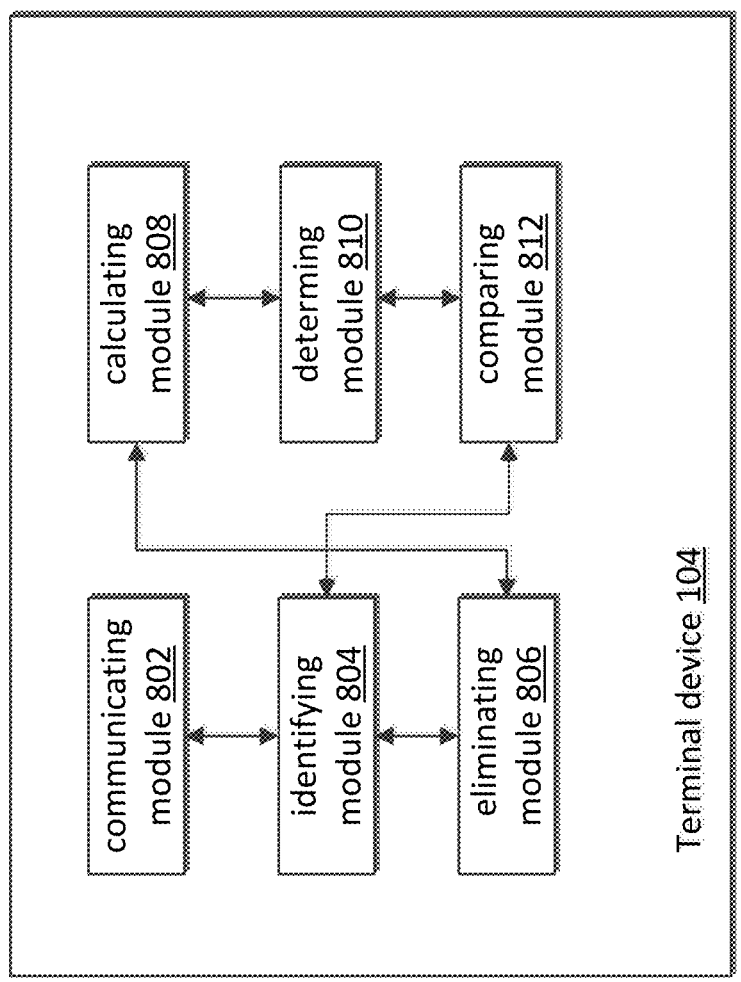
FIG. 8 illustrates a block diagram of a terminal device that may be used for implementing the methods according to an example embodiment.

FIG. 8 illustrates a block diagram of hierarchical a terminal device 104 that may be used for implementing the methods according to an embodiment of the invention. The terminal device 104 includes a communicating module 802, an identifying module 804, an eliminating module 806, a calculating module 808, a determining module 810 and a comparing module 812.

The communicating module 802 is connected to the identifying module 804, is configured to communicate in an omni-directional format to obtain discovered devices within the area, wherein the discovered devices include a target device, and communicate in a narrow beam format in a direction of the target device.

The identifying module 804 is connected to the communicating module 802, the eliminating module 806 and the comparing module 812. The identifying module 804 is configured to identify a first list of a first plurality of devices including the target device, wherein the first list comprises a device identifier (ID) of each device of the first plurality of devices;

The eliminating module 806 is connected to the identifying module 804 and the calculating module 808, is configured eliminate a device from the first list of devices, to create a second list of devices wherein the eliminated device has a lower relative received signal strength (RSSI).

The calculating module 808 is connected to the eliminating module 806 and the determining module 810. The calculating module 808 is configured to calculate a distance between the terminal device and each device in the second list of devices.

The determining module 810 is connected to the determining module 810 and the comparing module 812. The determining module 810 is configured to determine a precise distance between the terminal device and the target device using a precise distance measurement method.

The comparing module 812 is connected to the comparing module 812 and the identifying module 804. The comparing module 812 is configured to compare the measured precise distance to the calculated distance for each device in the second list of devices to determine which device of the second list of devices has a distance that compares favorably to the precisely determined distance.

The identifying module further configured to identifying the device ID corresponding to the device having the favorable comparison as the target device's ID.

It is understood that except for the above functions, the communicating module 802, the identifying module 804, the eliminating module 806, the calculating module 808, the determining module 810 and the comparing module 812 may also perform the functions of the terminal device 104 described in FIGS. 1-7.

Any of the communicating module 802, the identifying module 804, the eliminating module 806, the calculating module 808, the determining module 810 and the comparing module 812 maybe embodied in a general-purpose central procession unit (CPU), general process, digital signal processor (DSP), field programmable gate array (FPGA), an application-specific integrated circuit (ASIC), or one or more integrated circuits configured to control the execution of program routines as specified by the present invention. The communicating module 802, the identifying module 804, the eliminating module 806, the calculating module 808, the determining module 810 and the comparing module 812 may also be a combination of computing function, such as a combination including one or more microprocessors, combination including DSP and microprocessors and so on. The communicating module 802 may be combined in a transceiver which includes any suitable structure for generating signals for wireless transmission and/or processing signals received wirelessly. And the communicating module 802 may receive and send signals from or to (3G, 4G, 5G), Universal Mobile Telecommunications Service (UMTS), Code Division Multiple Access (CDMA), Global System for Mobiles (GMS) etc. network.

Further examples of the disclosure are listed below though the claims should not be limited to merely what has been illustrated.

Example 1. A method by a terminal device for identifying a target device in a local area network (LAN) comprising a plurality of potential target devices, comprising:
communicating in an omni-directional format to obtain discovered devices within the area, wherein the discovered devices include a target device;
communicating in a narrow beam format in a direction of the target device; identifying a first list of a first plurality of devices including the target device, wherein the first list comprises a device identifier (ID) of each device of the first plurality of devices;
eliminating a device from the first list of devices, wherein the eliminated device has a lower relative received signal strength (RSSI) to create a second list of devices;
calculating a distance between the terminal device and each device in the second list of devices;
determining a precise distance between the terminal device and the target device using a precise distance measurement method;
comparing the measured precise distance to the calculated distance for each device in the second list of devices to determine which device of the second list of devices has a distance that compares favorably to the precisely determined distance; and
identifying the device ID corresponding to the device having the favorable comparison as the target device's ID.

Example 2. The method according to example 1, further comprising:
determining that an access point (AP) is in a local area network (LAN); and operating the terminal device in an AP mode.

Example 3. The method according to any one of examples 1-2, further comprising:
obtaining location information and a device ID of each of the discovered devices; wherein the discovered devices comprise the first plurality of devices.

Example 4. The method according to any one of examples 1-3, wherein the terminal device comprises a SpotFi algorithm, and the obtaining the location information of each of the discovered devices comprises:
estimating, using the SpotFi algorithm, the location information of each of the discovered devices.

Example 5. The method according to any one of examples 1-4, the obtaining the location information each of the discovered devices comprises:

obtaining the location information of the discovered device from an access point (AP) comprising an SpotFi algorithm.

Example 6. The method according to any one of examples 1-5, wherein calculating a distance between the terminal device and each device in the second list of devices comprises:

calculating a distance between the terminal device and each device in the second list based on the location information of each device in the second list of devices.

Example 7. The method according to any one of examples 1-6, wherein the precise distance calculation method is not based on location information of each device in the second list of devices.

Example 8. The method according to any one of examples 1-7, wherein the terminal device comprises a first button to switch between the omni-directional format and the narrow beam format, the method further comprises:

checking that the first button remains depressed to turn on a dedicated directional antenna.

Example 9. The method according to any one of examples 1-8, wherein the terminal device comprises a first button to switch between the omni-directional format and the narrow beam format, the method further comprises:

checking that the first button remains depressed to narrow a beam of an omni-directional Wi-Fi antenna via a beamforming technique.

Example 10. The method according to any one of examples 1-9, further comprising:

sending a connection request to the target device according to the identified device ID.

Example 11. The method according to any one of examples 1-10, further comprising:

recording the identified device ID into a recipient list.

Example 12. The method according to any one of examples 1-11, further comprising:

determining that there is another target device to be identified; and repeating the communicating in the narrow beam format, the identifying the first list of a first plurality of devices, eliminating devices from the first list of devices, the calculating the distance, the determining the precise distance, the comparing, the identifying the device ID corresponding to the device, and recording the identified device ID.

Example 13. The method according to any one of examples 1-11, wherein the terminal device comprises a second button to instruct whether there is another target device to be connected, determining that there is no other target device to be identified comprises:

checking that the second button is pressed.

Example 14. The method according to any one of examples 1-13, further comprising:

determining that no response is received from the target device; and setting a timer to wait a response for the target device which does not respond to the terminal device.

Example 15. A terminal device for identifying a target device in a local area network (LAN) comprising a plurality of potential target devices, comprising:

a non-transitory memory comprising instructions; and one or more processors in communications with the memory, wherein the one or more processors are configured to execute the instructions to:

communicate in an omni-directional format to obtain discovered devices within the area, wherein the discovered devices include a target device;

communicate in a narrow beam format in a direction of the target device;

identify a first list of a first plurality of devices including the target device, wherein the first list comprises a device identifier (ID) of each device of the first plurality of devices;

eliminate a device from the first list of devices, wherein the eliminated device has a lower relative received signal strength (RSSI) to create a second list of devices;

calculate a distance between the terminal device and each device in the second list of devices;

determine a precise distance between the terminal device and the target device using a precise distance measurement method;

compare the measured precise distance to the calculated distance for each device in the second list of devices to determine which device of the second list of devices has a distance that compares favorably to the precisely determined distance; and identify the device ID corresponding to the device having the favorable comparison as the target device's ID.

Example 16. The terminal device according to example 15, wherein the one or more processors are configured to further execute the instructions to: determine that an access point (AP) is in a local area network (LAN), and operate the terminal device in an AP mode.

Example 17. The terminal device according to any one of examples 15-16, wherein the one or more processors are configured to further execute the instructions to: obtain location information and a device ID of each of the discovered devices; wherein the discovered devices comprise the first plurality of devices.

Example 18. The terminal device according to any one of examples 15-17, wherein the terminal device comprises a SpotFi algorithm, wherein the one or more processors are configured to further execute the instructions to:

estimate, using the SpotFi algorithm, the location information of each of the discovered devices.

Example 19. The terminal device according to any one of examples 15-18, wherein the terminal device comprises a SpotFi algorithm, wherein the one or more processors are configured to further execute the instructions to:

obtaining the location information of the discovered device from an access point (AP) comprising an SpotFi algorithm.

20. A computer readable media that includes computer instructions that, when executed by a processor, cause a processor host device to perform the steps of:

communicating in an omni-directional format to obtain discovered devices within the area, wherein the discovered devices include a target device;

communicating in a narrow beam format in a direction of the target device;

identifying a first list of a first plurality of devices including the target device, wherein the first list comprises a device identifier (ID) of each device of the first plurality of devices;

eliminating a device from the first list of devices, wherein the eliminated device has a lower relative received signal strength (RSSI) to create a second list of devices;

calculating a distance between the terminal device and each device in the second list of devices;

determining a precise distance between the terminal device and the target device using a precise distance measurement method;

comparing the measured precise distance to the calculated distance for each device in the second list of devices to determine which device of the second list of devices has a distance that compares favorably to the precisely determined distance; and identifying the device ID corresponding to the device having the favorable comparison as the target device's ID.

Although a few embodiments have been described in detail above, other modifications are possible. For example, the logic flows depicted in the Figures do not require the particular order shown, or sequential order, to achieve desirable results. Other Steps may be provided, or Steps may be eliminated, from the described flows, and other components may be added to, or removed from, the described systems. Other embodiments may be within the scope of the following claims.

What is claimed is:

1. A method by a terminal device for identifying a target device in a local area network (LAN) comprising a plurality of potential target devices, comprising:
  communicating in an omni-directional format to obtain discovered devices within the area, wherein the discovered devices include a target device;
  communicating in a narrow beam format in a direction of the target device;
  identifying a first list of a first plurality of devices including the target device, wherein the first list comprises a device identifier (ID) of each device of the first plurality of devices;
  eliminating a device from the first list of devices to create a second list of devices, wherein the eliminated device has a lower relative received signal strength (RSSI);
  calculating a distance between the terminal device and each device in the second list of devices;
  determining a precise distance between the terminal device and the target device using a precise distance measurement method;
  comparing the measured precise distance to the calculated distance for each device in the second list of devices to determine which device of the second list of devices has a distance that compares favorably to the precisely determined distance; and
  identifying the device ID corresponding to the device having the favorable comparison as the target device's ID.

2. The method according to claim 1, further comprising:
  determining that an access point (AP) is in a local area network (LAN); and
  operating the terminal device in an AP mode.

3. The method according to claim 1, further comprising:
  obtaining location information and a device ID of each of the discovered devices; wherein the discovered devices comprise the first plurality of devices.

4. The method according to claim 3, wherein the terminal device comprises a SpotFi algorithm, and the obtaining the location information of each of the discovered devices comprises:
  estimating, using the SpotFi algorithm, the location information of each of the discovered devices.

5. The method according to claim 3, the obtaining the location information each of the discovered devices comprises:
  obtaining the location information of the discovered device from an access point (AP) comprising an SpotFi algorithm.

6. The method according to claim 3, wherein calculating a distance between the terminal device and each device in the second list of devices comprises:
  calculating a distance between the terminal device and each device in the second list based on the location information of each device in the second list of devices.

7. The method according to claim 1, wherein the precise distance calculation method is not based on location information of each device in the second list of devices.

8. The method according to claim 1, wherein the terminal device comprises a first button to switch between the omni-directional format and the narrow beam format, the method further comprises:
  checking that the first button remains depressed to turn on a dedicated directional antenna.

9. The method according to claim 1, wherein the terminal device comprises a first button to switch between the omni-directional format and the narrow beam format, the method further comprises:
  checking that the first button remains depressed to narrow a beam of an omni-directional Wi-Fi antenna via a beamforming technique.

10. The method according to claim 1, further comprising:
  sending a connection request to the target device according to the identified device ID.

11. The method according to claim 10, further comprising:
  recording the identified device ID into a recipient list.

12. The method according to claim 11, further comprising:
  determining that there is another target device to be identified; and
  repeating the communicating in the narrow beam format, the identifying the first list of a first plurality of devices, eliminating devices from the first list of devices, the calculating the distance, the determining the precise distance, the comparing, the identifying the device ID corresponding to the device, and recording the identified device ID.

13. The method according to claim 11, wherein the terminal device comprises a second button to instruct whether there is another target device to be identified, determining that there is no other target device to be connected comprises:
  checking that the second button is pressed.

14. The method according to claim 10, further comprising:
  determining that no response is received from the target device; and
  setting a timer to wait a response for the target device which does not respond to the terminal device.

15. A terminal device for identifying a target device in a local area network (LAN) comprising a plurality of potential target devices, comprising:
  a non-transitory memory comprising instructions; and
  one or more processors in communications with the memory, wherein the one or more processors are configured to execute the instructions to:
  communicate in an omni-directional format to obtain discovered devices within the area, wherein the discovered devices include a target device;
  communicate in a narrow beam format in a direction of the target device;
  identify a first list of a first plurality of devices including the target device, wherein the first list comprises a device identifier (ID) of each device of the first plurality of devices;
  eliminate a device from the first list of devices to create a second list of devices, wherein the eliminated device has a lower relative received signal strength (RSSI);
  calculate a distance between the terminal device and each device in the second list of devices;

determine a precise distance between the terminal device and the target device using a precise distance measurement method;

compare the measured precise distance to the calculated distance for each device in the second list of devices to determine which device of the second list of devices has a distance that compares favorably to the precisely determined distance; and identify the device ID corresponding to the device having the favorable comparison as the target device's ID.

16. The terminal device according to claim 15, wherein the one or more processors are configured to further execute the instructions to: determine that an access point (AP) is in a local area network (LAN), and operate the terminal device in an AP mode.

17. The terminal device according to claim 15, wherein the one or more processors are configured to further execute the instructions to: obtain location information and a device ID of each of the discovered devices; wherein the discovered devices comprise the first plurality of devices.

18. The terminal device according to claim 17, wherein the terminal device comprises a SpotFi algorithm, wherein the one or more processors are configured to further execute the instructions to:

estimate, using the SpotFi algorithm, the location information of each of the discovered devices.

19. The terminal device according to claim 17, wherein the terminal device comprises a SpotFi algorithm, wherein the one or more processors are configured to further execute the instructions to:

obtaining the location information of the discovered device from an access point (AP) comprising an SpotFi algorithm.

20. A non-transitory computer-readable media that includes computer instructions that, when executed by a processor, cause a processor host device to perform the steps of:

communicating in an omni-directional format to obtain discovered devices within the area, wherein the discovered devices include a target device;

communicating in a narrow beam format in a direction of the target device;

identifying a first list of a first plurality of devices including the target device, wherein the first list comprises a device identifier (ID) of each device of the first plurality of devices;

eliminating a device from the first list of devices to create a second list of devices, wherein the eliminated device has a lower relative received signal strength (RSSI);

calculating a distance between the terminal device and each device in the second list of devices;

determining a precise distance between the terminal device and the target device using a precise distance measurement method;

comparing the measured precise distance to the calculated distance for each device in the second list of devices to determine which device of the second list of devices has a distance that compares favorably to the precisely determined distance; and identifying the device ID corresponding to the device having the favorable comparison as the target device's ID.

* * * * *